(12) United States Patent
Nelson et al.

(10) Patent No.: US 11,253,972 B2
(45) Date of Patent: Feb. 22, 2022

(54) STRUCTURED ABRASIVE ARTICLES AND METHODS OF MAKING THE SAME

(71) Applicant: 3M INNOVATIVE PROPERTIES COMPANY, St. Paul, MN (US)

(72) Inventors: Thomas J. Nelson, St. Paul, MN (US); Joseph B. Eckel, Vadnais Heights, MN (US); Aaron K. Nienaber, Maplewood, MN (US); Scott W. Peterson, Highlands Ranch, MN (US); Vincent R. Jansen, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 5 days.

(21) Appl. No.: 16/344,297

(22) PCT Filed: Oct. 6, 2017

(86) PCT No.: PCT/US2017/055602
§ 371 (c)(1),
(2) Date: Apr. 23, 2019

(87) PCT Pub. No.: WO2018/080765
PCT Pub. Date: May 3, 2018

(65) Prior Publication Data
US 2019/0270183 A1 Sep. 5, 2019

Related U.S. Application Data

(60) Provisional application No. 62/412,427, filed on Oct. 25, 2016.

(51) Int. Cl.
*B24D 11/00* (2006.01)
*B24D 3/28* (2006.01)
(Continued)

(52) U.S. Cl.
CPC ............ *B24D 11/001* (2013.01); *B24B 37/22* (2013.01); *B24D 3/28* (2013.01); *B24D 11/02* (2013.01); *C09K 3/1409* (2013.01)

(58) Field of Classification Search
CPC ........ B24D 11/001; B24D 3/28; B24D 11/02; C09K 3/1409
See application file for complete search history.

(56) References Cited

U.S. PATENT DOCUMENTS 1,930,788 A 10/1933 Buckner
2,216,728 A 10/1940 Benner
(Continued)

FOREIGN PATENT DOCUMENTS

CN 86 1 00414 A 4/1987
CN 1102800 A 5/1995
(Continued)

OTHER PUBLICATIONS

Barbee, Jr., "Microstructure of amorphous 304 stainless steel-carbon alloys synthesized by magnetron sputter deposition", Thin Solid Films, 1979, vol. 63, No. 1, pp. 143-150.
(Continued)

*Primary Examiner* — Pegah Parvini
(74) *Attorney, Agent, or Firm* — Bradford B. Wright

(57) ABSTRACT

A structured abrasive article comprises a plurality of shaped abrasive composites disposed on and secured to a major surface of a backing. The shaped abrasive composites comprise magnetizable abrasive particles retained in an organic binder. On a respective basis, each of the magnetizable abrasive particles has a ceramic body with a magnetizable layer disposed on at least a portion thereof. Methods of making and using the structured abrasive articles are also disclosed.

17 Claims, 2 Drawing Sheets

(51) Int. Cl.
  *B24D 11/02* (2006.01)
  *C09K 3/14* (2006.01)
  *B24B 37/22* (2012.01)

(56) References Cited

U.S. PATENT DOCUMENTS

| | | |
|---|---|---|
| 2,318,570 A | 5/1943 | Carlton |
| 2,370,636 A | 3/1945 | Carlton |
| 2,527,044 A | 10/1950 | Walton |
| 2,857,879 A | 10/1958 | Johnson |
| 2,947,616 A | 8/1960 | Coes, Jr. |
| 2,958,593 A | 11/1960 | Hoover |
| 3,306,719 A | 2/1967 | Fringhian |
| 3,495,960 A | 2/1970 | Schladitz |
| 3,625,666 A | 12/1971 | James |
| 3,918,217 A | 11/1975 | Oliver |
| 4,008,055 A | 2/1977 | Phaal |
| 4,018,575 A | 4/1977 | Davis |
| 4,227,350 A | 10/1980 | Fitzer |
| 4,246,004 A | 1/1981 | Busch |
| 4,314,827 A | 2/1982 | Leitheiser |
| 4,331,453 A | 5/1982 | Dau |
| 4,609,380 A | 9/1986 | Barnett |
| 4,612,242 A | 9/1986 | Vesley |
| 4,623,364 A | 11/1986 | Cottringer |
| 4,652,274 A | 3/1987 | Boettcher |
| 4,652,275 A | 3/1987 | Bloecher |
| 4,734,104 A | 3/1988 | Broberg |
| 4,744,802 A | 5/1988 | Schwabel |
| 4,751,137 A | 6/1988 | Halg |
| 4,751,138 A | 6/1988 | Tumey |
| 4,770,671 A | 9/1988 | Monroe |
| 4,799,939 A | 1/1989 | Bloecher |
| 4,800,685 A | 1/1989 | Haynes, Jr. |
| 4,881,951 A | 11/1989 | Wood |
| 4,898,597 A | 2/1990 | Hay |
| 4,903,440 A | 2/1990 | Larson |
| 4,916,869 A | 4/1990 | Oliver |
| 4,933,373 A | 6/1990 | Moren |
| 4,985,340 A | 1/1991 | Palazzotto |
| 4,991,362 A | 2/1991 | Heyer |
| 5,009,675 A | 4/1991 | Kunz |
| 5,086,086 A | 2/1992 | Brown-Wensley |
| 5,137,542 A | 8/1992 | Buchanan |
| 5,152,917 A | 10/1992 | Pieper |
| 5,181,939 A | 1/1993 | Neff |
| 5,201,916 A | 4/1993 | Berg |
| 5,213,591 A | 5/1993 | Celikkaya |
| 5,236,472 A | 8/1993 | Kirk |
| 5,254,194 A | 10/1993 | Ott |
| 5,282,875 A | 2/1994 | Wood |
| 5,366,523 A | 11/1994 | Rowenhorst |
| 5,376,428 A | 12/1994 | Palazzotto |
| 5,380,390 A | 1/1995 | Tselesin |
| 5,385,954 A | 1/1995 | Palazzotto |
| 5,417,726 A | 5/1995 | Stout |
| 5,435,816 A | 7/1995 | Spurgeon |
| 5,454,844 A | 10/1995 | Hibbard |
| 5,500,273 A | 3/1996 | Holmes |
| 5,547,479 A * | 8/1996 | Conwell ............... C09K 3/1436 51/309 |
| 5,554,068 A | 9/1996 | Carr |
| 5,573,619 A | 11/1996 | Benedict |
| 5,591,239 A | 1/1997 | Larson |
| RE35,570 E | 7/1997 | Rowenhorst |
| 5,672,097 A | 9/1997 | Hoopman |
| 5,672,186 A | 9/1997 | Chesley |
| 5,681,217 A | 10/1997 | Hoopman |
| 5,681,361 A | 10/1997 | Sanders, Jr. |
| 5,700,302 A | 12/1997 | Stoetzel |
| 5,712,210 A | 1/1998 | Windisch |
| 5,817,204 A | 10/1998 | Tselesin |
| 5,833,724 A | 11/1998 | Wei |
| 5,851,247 A | 11/1998 | Stoetzel |
| 5,858,140 A | 1/1999 | Berger |
| 5,863,306 A | 1/1999 | Wei |
| 5,891,204 A | 4/1999 | Neff |
| 5,908,476 A | 6/1999 | Nishio |
| 5,928,070 A | 7/1999 | Lux |
| 5,942,015 A | 8/1999 | Culler |
| 5,946,991 A | 9/1999 | Hoopman |
| 5,975,987 A | 11/1999 | Hoopman |
| 5,984,988 A | 11/1999 | Berg |
| 6,017,831 A | 1/2000 | Beardsley |
| 6,048,375 A | 4/2000 | Yang |
| 6,083,631 A | 7/2000 | Neff |
| 6,120,568 A | 9/2000 | Neff |
| 6,129,540 A | 10/2000 | Hoopman |
| 6,139,594 A | 10/2000 | Kincaid |
| 6,207,246 B1 | 3/2001 | Moren |
| 6,261,682 B1 | 7/2001 | Law |
| 6,293,980 B2 | 9/2001 | Wei |
| 6,302,930 B1 | 10/2001 | Lux |
| 6,319,108 B1 | 11/2001 | Adefris |
| 6,354,929 B1 | 3/2002 | Adefris |
| 6,521,004 B1 | 2/2003 | Culler |
| 6,551,366 B1 | 4/2003 | D'Souza |
| 6,620,214 B2 | 9/2003 | McArdle |
| 6,645,624 B2 | 11/2003 | Adefris |
| 6,702,650 B2 | 3/2004 | Adefris |
| 6,773,475 B2 * | 8/2004 | Ohishi ............... B24B 19/226 451/28 |
| 6,790,126 B2 | 9/2004 | Wood |
| 6,817,935 B2 | 11/2004 | Bates |
| 6,881,483 B2 | 4/2005 | McArdle |
| 6,913,824 B2 | 7/2005 | Culler |
| 6,951,504 B2 | 10/2005 | Adefris |
| 7,399,330 B2 | 7/2008 | Schwabel |
| 7,410,413 B2 | 8/2008 | Woo |
| 7,491,251 B2 | 2/2009 | Welygan |
| 7,727,931 B2 | 6/2010 | Brey |
| 7,887,608 B2 | 2/2011 | Schwabel |
| 8,034,137 B2 | 10/2011 | Erickson |
| 8,142,531 B2 | 3/2012 | Adefris |
| 8,142,532 B2 | 3/2012 | Erickson |
| 8,142,891 B2 | 3/2012 | Culler |
| 8,262,758 B2 | 9/2012 | Gao |
| 8,425,278 B2 | 4/2013 | Culler |
| 8,698,394 B2 | 4/2014 | McCutcheon |
| 8,869,740 B2 | 10/2014 | Moren |
| 9,440,332 B2 | 9/2016 | Gaeta |
| 2001/0041511 A1 | 11/2001 | Lack |
| 2002/0160694 A1 | 10/2002 | Wood |
| 2003/0022604 A1 | 1/2003 | Annen |
| 2003/0143938 A1 | 7/2003 | Braunschweig |
| 2005/0218566 A1 | 10/2005 | Suzuki |
| 2005/0279028 A1 | 11/2005 | Keipert |
| 2007/0254560 A1 | 11/2007 | Woo |
| 2008/0131705 A1 | 6/2008 | Colburn |
| 2008/0289262 A1 | 11/2008 | Gao |
| 2009/0165394 A1 | 7/2009 | Culler |
| 2009/0169816 A1 | 7/2009 | Erickson |
| 2010/0146867 A1 | 6/2010 | Boden |
| 2010/0151196 A1 | 6/2010 | Adefris |
| 2011/0088330 A1 | 4/2011 | Beekman |
| 2012/0137597 A1 | 6/2012 | Adefris |
| 2012/0227333 A1 | 9/2012 | Adefris |
| 2013/0008422 A1 * | 1/2013 | Kasashima ............... B24D 3/06 125/15 |
| 2013/0040537 A1 | 2/2013 | Schwabel |
| 2013/0125477 A1 | 5/2013 | Adefris |
| 2013/0244552 A1 | 9/2013 | Lee |
| 2013/0252521 A1 | 9/2013 | Kasashima |
| 2013/0252522 A1 | 9/2013 | Kasashima |
| 2013/0344786 A1 | 12/2013 | Keipert |
| 2014/0000176 A1 | 1/2014 | Moren |
| 2014/0073230 A1 * | 3/2014 | McNeal ............... B24D 3/06 451/546 |
| 2014/0080393 A1 | 3/2014 | Ludwig |
| 2014/0106126 A1 | 4/2014 | Gaeta |
| 2014/0237907 A1 | 8/2014 | Boden |
| 2014/0259961 A1 | 9/2014 | Moren |
| 2014/0290147 A1 | 10/2014 | Seth |
| 2014/0291895 A1 | 10/2014 | Kanade |

(56) References Cited

U.S. PATENT DOCUMENTS

| | | | |
|---|---|---|---|
| 2015/0259587 A1* | 9/2015 | Oldenkotte | C09K 3/1418 51/309 |
| 2015/0267097 A1 | 9/2015 | Rosenflanz | |
| 2015/0291865 A1 | 10/2015 | Breder | |
| 2016/0221153 A1 | 8/2016 | Rizzo, Jr. | |
| 2016/0289520 A1* | 10/2016 | Bujnowski | B24D 3/02 |

FOREIGN PATENT DOCUMENTS

| | | |
|---|---|---|
| CN | 1830626 | 9/2006 |
| CN | 1830626 A | 9/2006 |
| CN | 101353566 | 1/2009 |
| CN | 101797725 A | 8/2010 |
| CN | 102085645 A | 6/2011 |
| CN | 103590090 | 2/2014 |
| CN | 104191385 | 12/2014 |
| CN | 104999385 | 10/2015 |
| CN | 105269474 A | 1/2016 |
| CN | 105269475 A | 1/2016 |
| CN | 106002654 A | 10/2016 |
| DE | 3042643 | 7/1981 |
| DE | 102012221316 | 5/2014 |
| DE | 202014101741 | 6/2014 |
| DE | 102013212609 | 12/2014 |
| DE | 102013212617 | 12/2014 |
| DE | 102013212639 | 12/2014 |
| DE | 102013212666 | 12/2014 |
| DE | 102013212684 | 12/2014 |
| EP | 0 650 807 A1 | 5/1995 |
| EP | 1122718 A2 | 8/2001 |
| GB | 396231 | 8/1933 |
| GB | 1477767 | 6/1977 |
| JP | 63232947 | 9/1988 |
| JP | 0778509 | 3/1995 |
| JP | 11165252 | 6/1999 |
| JP | 2002053367 | 2/2002 |
| JP | 2004098265 | 4/2004 |
| JP | 2004098266 | 4/2004 |
| JP | 2005153106 | 6/2005 |
| JP | 2006089586 | 4/2006 |
| JP | 2012131017 | 7/2012 |
| JP | 2012131018 | 7/2012 |
| JP | 2015155142 | 8/2015 |
| JP | 5982580 | 8/2016 |
| KR | 1020100136807 | 12/2010 |
| KR | 101473367 | 5/2014 |
| SU | 1495100 | 7/1989 |
| WO | WO 94-27833 | 12/1994 |
| WO | WO 2009-011973 | 1/2009 |
| WO | WO 2010-041645 | 4/2010 |
| WO | WO 2012-112305 | 8/2012 |
| WO | WO 2014/206967 A1 | 12/2014 |
| WO | WO 2015-048768 | 4/2015 |
| WO | WO 2015-088953 | 6/2015 |
| WO | WO 2015-100018 | 7/2015 |
| WO | WO 2015-100020 | 7/2015 |
| WO | WO 2015-100220 | 7/2015 |
| WO | WO 2018-080703 | 5/2018 |
| WO | WO 2018-080704 | 5/2018 |
| WO | WO 2018-080705 | 5/2018 |
| WO | WO 2018-080755 | 5/2018 |
| WO | WO 2018-080756 | 5/2018 |
| WO | WO 2018-080784 | 5/2018 |
| WO | WO 2018-080799 | 5/2018 |

OTHER PUBLICATIONS

Rampal, "Comparing the Magnetic Abrasives by Investigating the Surface Finish", Journal of Engineering, Computers & Applied Sciences (JEC&AS), Oct. 2012, vol. 1, No. 1, pp. 20-24.

Sodium and Potassium Silicates, PQ Europe, Oct. 2004, 16 pages.

International Search Report for PCT International Application No. PCT/US2017/055602, dated Jan. 5, 2018, 4 pages.

Xiao, Shigang, Cutting Tool Materials and Proper Selection Thereof, $1^{st}$ Edition, China Machine Press, Apr. 1990, pp. 525.

* cited by examiner

STRUCTURED ABRASIVE ARTICLES AND METHODS OF MAKING THE SAME

TECHNICAL FIELD

The present disclosure broadly relates to coated abrasive articles and methods of making and using them.

BACKGROUND

Structured abrasive articles are a specific type of coated abrasive article that has a plurality of shaped abrasive composites secured to a major surface of a backing. Each shaped abrasive composite has a bottom surface in contact with the backing and a distal end that extends outwardly from the backing. The shaped abrasive composites comprise abrasive particles dispersed in a binder matrix that includes a binder (organic or vitreous). The shaped abrasive composites are usually arranged in an array. In one common configuration of a structured abrasive article, the shaped abrasive composites are pyramids (e.g., 3, 4, or 6 sided), truncated pyramids (e.g., 3, 4, or 6 sided), prisms (e.g., 3, 4, or 6 sided).

The shaped abrasive composites can have sizes ranging from very small (e.g., for automotive clearcoat finishing) or quite large (e.g., stock removal), depending on the application.

Variations in the shape of the abrasive composites has been used as one method to control abrading performance; for example, as disclosed in U.S. Pat. No. 8,425,278 (Culler et al.) and U.S. Pat. No. 7,410,413 (Koehnle et al.).

There remains a continuing need for methods of controlling (e.g., improving) the abrading performance of structured abrasive articles.

SUMMARY

Advantageously, the present inventors have discovered a method of orienting the abrasive particles within the shaped abrasive composites of shaped abrasive particles that may lead to improved abrading performance. This alignment is achieved using magnetizable abrasive particles which are aligned by a magnetic field during manufacture of the structured abrasive articles.

In one aspect, the present disclosure provides a structured abrasive article comprising a plurality of shaped abrasive composites disposed on and secured to a major surface of a backing, wherein the shaped abrasive composites comprise magnetizable abrasive particles retained in an organic binder, wherein, on a respective basis, each of the magnetizable abrasive particles has a ceramic body with a magnetic layer disposed on at least a portion thereof. In some embodiments, a majority of the magnetizable abrasive particles are aligned substantially perpendicular to the major surface of the backing.

In another aspect, the present disclosure provides a method of making a structured abrasive article, the method comprising the steps:

a) providing a production tool having a mold surface defining a plurality of precisely-shaped cavities;

b) filling at least a majority of the precisely-shaped cavities with a slurry comprising magnetizable abrasive particles dispersed in a curable organic binder precursor material, wherein, on a respective basis, the magnetizable abrasive particles each comprise a ceramic body having a magnetic layer disposed on at least a portion thereof, wherein the magnetizable abrasive particles have an average aspect ratio of at least 3;

c) contacting a major surface of a backing with the mold surface of the production tool while the slurry is disposed within said at least a majority of the precisely-shaped cavities;

d) orienting the magnetizable abrasive particles by means of a magnetic field;

e) at least partially curing the curable organic binder precursor material to form shaped abrasive composites disposed on the major surface of the backing; and f) separating the shaped abrasive composites from the production tool.

In yet another aspect, the present disclosure provides a method of making a structured abrasive article, the method comprising the steps:

a) contacting a major surface of a backing with a malleable composition comprising magnetizable abrasive particles dispersed in a curable organic binder precursor, wherein, on a respective basis, the magnetizable abrasive particles each comprise a ceramic body having a magnetic layer disposed on at least a portion thereof, wherein the magnetizable abrasive particles have an average aspect ratio of at least 3;

b) orienting the magnetizable abrasive particles by means of a magnetic field;

c) at least partially curing the curable organic binder precursor to form shaped abrasive composites disposed on the major surface of the backing.

As used herein:

The term "ceramic" refers to any of various hard, brittle, heat- and corrosion-resistant materials made of at least one metallic element (which may include silicon) combined with oxygen, carbon, nitrogen, or sulfur. Ceramics may be crystalline or polycrystalline, for example.

The term "ferrimagnetic" refers to materials that exhibit ferrimagnetism. Ferrimagnetism is a type of permanent magnetism that occurs in solids in which the magnetic fields associated with individual atoms spontaneously align themselves, some parallel, or in the same direction (as in ferromagnetism), and others generally antiparallel, or paired off in opposite directions (as in antiferromagnetism). The magnetic behavior of single crystals of ferrimagnetic materials may be attributed to the parallel alignment; the diluting effect of those atoms in the antiparallel arrangement keeps the magnetic strength of these materials generally less than that of purely ferromagnetic solids such as metallic iron. Ferrimagnetism occurs chiefly in magnetic oxides known as ferrites. The spontaneous alignment that produces ferrimagnetism is entirely disrupted above a temperature called the Curie point, characteristic of each ferrimagnetic material. When the temperature of the material is brought below the Curie point, ferrimagnetism revives.

The term "ferromagnetic" refers to materials that exhibit ferromagnetism. Ferromagnetism is a physical phenomenon in which certain electrically uncharged materials strongly attract others. In contrast to other substances, ferromagnetic materials are magnetized easily, and in strong magnetic fields the magnetization approaches a definite limit called saturation. When a field is applied and then removed, the magnetization does not return to its original value. This phenomenon is referred to as hysteresis. When heated to a certain temperature called the Curie point, which is generally different for each substance, ferromagnetic materials lose their characteristic properties and cease to be magnetic; however, they become ferromagnetic again on cooling.

The terms "magnetic" and "magnetized" mean being ferromagnetic or ferrimagnetic at 20° C., or capable of being made so, unless otherwise specified. Preferably, magnetizable layers according to the present disclosure either have, or can be made to have by exposure to an applied magnetic field, a magnetic moment of at least 0.001 electromagnetic units (emu), more preferably at least 0.005 emu, more preferably 0.01 emu, up to an including 0.1 emu, although this is not a requirement.

The term "magnetic field" refers to magnetic fields that are not generated by any astronomical body or bodies (e.g., Earth or the sun). In general, magnetic fields used in practice of the present disclosure have a field strength in the region of the magnetizable abrasive particles being oriented of at least about 10 gauss (1 mT), preferably at least about 100 gauss (10 mT), and more preferably at least about 1000 gauss (0.1 T).

The term "magnetizable" means capable of being magnetized or already in a magnetized state.

The term "shaped ceramic body" refers to a ceramic body that has been intentionally shaped (e.g., extruded, die cut, molded, screen-printed) at some point during its preparation such that the resulting ceramic body is non-randomly shaped. The term "shaped ceramic body" as used herein excludes ceramic bodies obtained by a mechanical crushing or milling operation.

The term "shaped abrasive composite" refers to an abrasive composite that has been intentionally shaped (e.g., extruded, die cut, molded, screen-printed) at some point during its preparation such that the resulting shaped abrasive composite is non-randomly shaped. The term "shaped abrasive composite" as used herein excludes shaped abrasive composites obtained by a mechanical crushing or milling operation.

The terms "precisely-shaped ceramic body" refers to a ceramic body wherein at least a portion of the ceramic body has a predetermined shape that is replicated from a mold cavity used to form a precursor precisely-shaped ceramic body that is sintered to form the precisely-shaped ceramic body. A precisely-shaped ceramic body will generally have a predetermined geometric shape that substantially replicates the mold cavity that was used to form the shaped abrasive particle.

The term "precisely-shaped abrasive composite" refers to a shaped abrasive composite formed by a process in which it is formed by at least partially curing a slurry residing in a cavity in a mold before being removed from the mold such that the resulting abrasive composite substantially replicates the surface finish and/or shape of the cavity.

The term "length" refers to the longest dimension of an object.

The term "width" refers to the longest dimension of an object that is perpendicular to its length.

The term "thickness" refers to the longest dimension of an object that is perpendicular to both of its length and width.

The term "aspect ratio" refers to the ratio length/thickness of an object.

The term "essentially free of" means containing less than 5 percent by weight (e.g., less than 4, 3, 2, 1, 0.1, or even less than 0.01 percent by weight, or even completely free) of, based on the total weight of the object being referred to.

The term "substantially" means within 35 percent (preferably within 30 percent, more preferably within 25 percent, more preferably within 20 percent, more preferably within 10 percent, and more preferably within 5 percent) of the attribute being referred to.

The suffix "(s)" indicates that the modified word can be singular or plural.

Features and advantages of the present disclosure will be further understood upon consideration of the detailed description as well as the appended claims.

Figure 1:
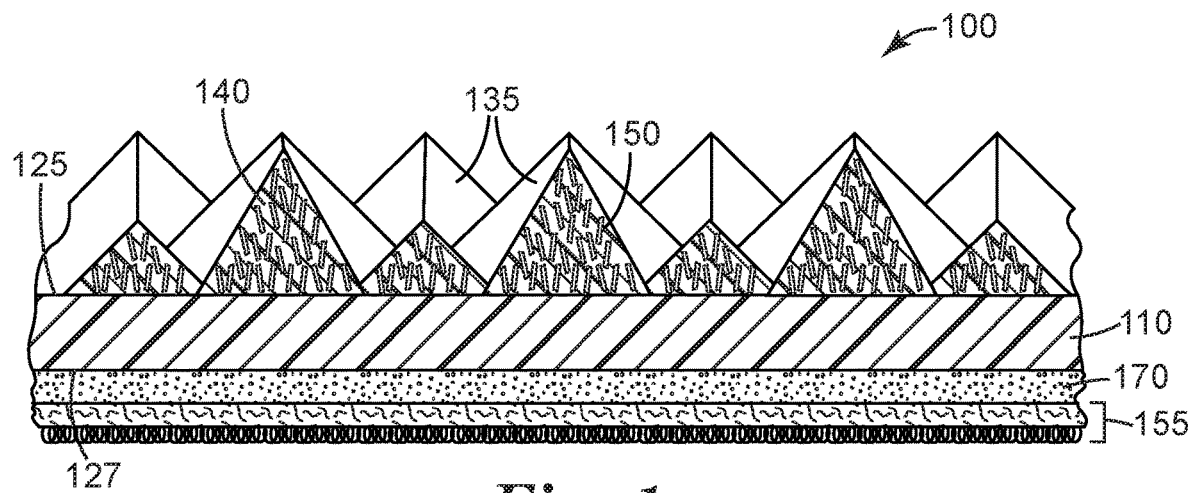
FIG. 1 is a schematic perspective view of an exemplary structured abrasive article 100 according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Referring now to FIG. 1, structured abrasive article 100 comprises a plurality of precisely-shaped pyramidal abrasive composites 135 disposed on and secured to a first major surface 125 of a backing 110. Shaped abrasive composites 135 comprise magnetizable abrasive particles 150 retained in an organic binder 140. Each of the magnetizable abrasive particles 150 has a ceramic body (not shown) with a magnetizable layer disposed on at least a portion thereof. See FIGS. 2 and 2A and FIGS. 3 and 3A for views of exemplary magnetizable abrasive particles. Magnetizable abrasive particles 150 are aligned substantially perpendicular to the first major surface 125 of backing 110. Optional attachment layer 155 is secured by optional adhesive layer 170 to second major surface 127 of backing 110 opposite first major surface 125.

Figure 2:
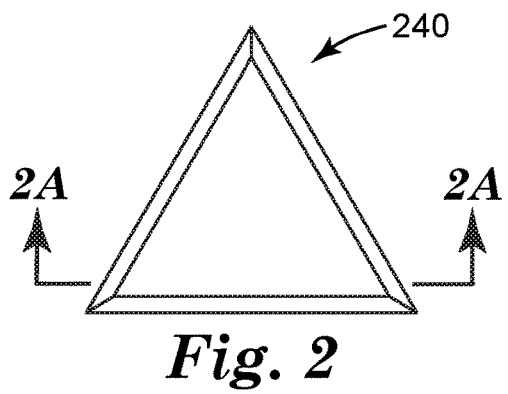
FIG. 2 is a schematic top view of an exemplary shaped abrasive composite 240 according to the present disclosure.
Figure 2A:
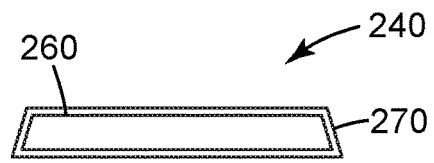
FIG. 2A is a schematic cross-sectional side view of magnetizable abrasive particle 240 taken along line 2A-2A.

Referring now to FIGS. 2 and 2A, exemplary magnetizable abrasive particle 240 has a ceramic body 260 with a magnetizable layer 270 disposed on and covering the ceramic body thereby enclosing it.

Figure 3:
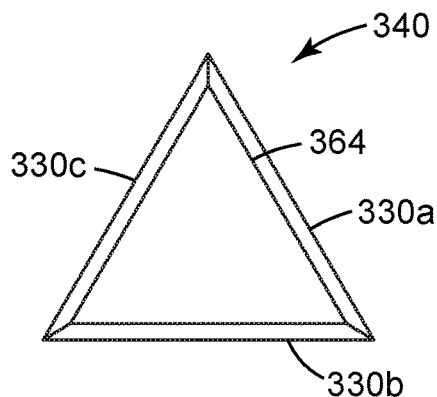
FIG. 3 is a schematic top view of an exemplary magnetizable abrasive particle 340.
Figure 3A:
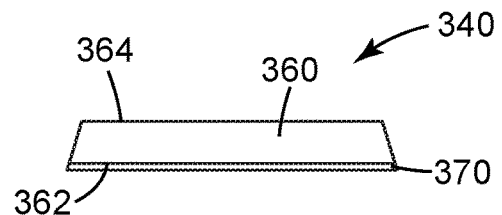
FIG. 3A is a schematic side view of magnetizable abrasive particle 340.

Referring now to FIG. 3, magnetizable abrasive particle 340 comprises precisely-shaped ceramic body 360 and magnetizable layer 370. Precisely-shaped ceramic body 360 has two opposed major surfaces 362, 364 connected to each other by three side surfaces 330*a*, 330*b*, 330*c*. Magnetizable layer 370 is disposed on major surface 362 of precisely-shaped ceramic body 360. In this configuration, the magnetizable layer may optionally extend somewhat onto other surfaces (e.g., 330*a*, 330*b*, and/or 330*c*) of precisely-shaped ceramic body 310, but does not extend to cover a majority of any other surface of the shaped ceramic body.

Magnetizable abrasive particles useful in practice of the present disclosure have a ceramic body having a magnetizable layer disposed on at least a portion thereof, wherein the magnetizable abrasive particles have an average aspect ratio (i.e., length to thickness ratio) of at least 3. In some embodiments, the magnetizable layer covers the ceramic body thereby enclosing it. In embodiments in which the ceramic body is shaped (also including precisely-shaped), the abrasive layer may be disposed on, and optionally proximate to a major surface or sidewall of the ceramic body.

Advantageously, magnetizable abrasive particles of this type can be preferentially aligned with magnetic field lines of force resulting in at least substantially parallel orientation of the magnetic layers and preferably also the magnetizable abrasive particles.

Alternatively, using two spaced apart magnets that are aligned north to south it is possible to provide a uniform magnetic field between the magnets, allowing parallel orientation of all of the magnetizable abrasive particles.

The magnetizable layer may be a unitary magnetizable material (e.g., vapor coated magnetizable metal), or it may comprise magnetizable particles in a binder matrix. Suitable binders may be vitreous or organic, for example, as described for the binder matrix hereinbelow. The binder matrix may be, for example selected from those vitreous and organic binders listed hereinabove, for example. The ceramic body can be any ceramic material (preferably a ceramic abrasive material), for example, selected from among the ceramic (i.e., not including diamond) abrasive materials listed hereinbelow. The magnetizable layer may be disposed on the ceramic body by any suitable method such as, for example, dip coating, spraying, painting, and powder coating. Individual magnetizable abrasive particles may have magnetizable layers with different degrees of coverage and/or locations of coverage.

Exemplary useful magnetizable materials for use in the magnetizable layer may comprise: iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (typically about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, alloys of neodymium, iron and boron (e.g., $Nd_2Fe_{14}B$), and alloys of samarium and cobalt (e.g., $SmCo_5$); MnSb; $MnOFe_2O_3$; $Y_3Fe_5O_{12}$; $CrO_2$; MnAs; ferrites such as ferrite, magnetite, zinc ferrite; nickel ferrite; cobalt ferrite, magnesium ferrite, barium ferrite, and strontium ferrite; yttrium iron garnet; and combinations of the foregoing. In some preferred embodiments, the magnetizable material comprises at least one metal selected from iron, nickel, and cobalt, an alloy of two or more such metals, or an alloy of at one such metal with at least one element selected from phosphorus and manganese. In some preferred embodiments, the magnetizable material is an alloy containing 8 to 12 weight percent (wt. %) aluminum, 15 to 26 wt. % nickel, 5 to 24 wt. % cobalt, up to 6 wt. % copper, up to 1 wt. % titanium, wherein the balance of material to add up to 100 wt. % is iron.

In some embodiments, the magnetizable layer may be deposited using a vapor deposition technique such as, for example, physical vapor deposition (PVD) including magnetron sputtering. PVD metallization of various particles is disclosed in, for example, U.S. Pat. No. 4,612,242 (Vesley) and U.S. Pat. No. 7,727,931 (Brey et al.). Metallic magnetizable layers can typically be prepared in this general manner.

In some embodiments, the magnetizable layer includes a binder that retains magnetizable particles. The binder may be inorganic (e.g., vitreous) or organic resin-based, and is typically formed from a respective binder precursor.

Vitreous binder may be produced from a precursor composition comprising a mixture or combination of one or more raw materials that when heated to a high temperature melt and/or fuse to form an integral vitreous binder matrix. The vitreous binder may be formed, for example, from frit. A frit is a composition that has been pre-fired before its use as a vitreous binder precursor composition for forming the vitreous binder of the magnetizable agglomerate abrasive particle.

As used herein, the term "frit" is a generic term for a material that is formed by thoroughly blending a mixture comprising one or more frit forming components, followed by heating (also referred to as pre-firing) the mixture to a temperature at least high enough to melt it; cooling the resulting glass, and crushing it. The crushed material can then be screened to a very fine powder.

Examples of suitable glasses for the vitreous binder and the frit for making it include silica glass, silicate glass, borosilicate glass, and combinations thereof. A silica glass is typically composed of 100 percent by weight of silica. In some embodiments, the vitreous binder is a glass that include metal oxides or oxides of metalloids, for example, aluminum oxide, silicon oxide, boron oxide, magnesium oxide, sodium oxide, manganese oxide, zinc oxide, calcium oxide, barium oxide, lithium oxide, potassium oxide, titanium oxide, metal oxides that can be characterized as pigments (e.g., cobalt oxide, chromium oxide, and iron oxide), and mixtures thereof.

Examples of suitable ranges for the vitreous binder and/or vitreous binder precursor, include, based on the total weight of the vitreous binder and/or vitreous binder precursor: 25 to 90% by weight, preferably 35 to 85% by weight of $SiO_2$; 0 to 40% by weight, preferably 0 to 30% by weight, of $B_2O_3$; 0 to 40% by weight, preferably 5 to 30% by weight, of $Al_2O_3$; 0 to 5% by weight, preferably 0 to 3% by weight, of $Fe_2O_3$; 0 to 5% by weight, preferably 0 to 3% by weight, of $TiO_2$; 0 to 20% by weight, preferably 0 to 10% by weight, of CaO; 0 to 20% by weight, preferably 1 to 10% by weight, of MgO; 0 to 20% by weight, preferably 0 to 10% by weight, of $K_2O$; 0 to 25% by weight, preferably 0 to 15% by weight, of $Na_2O$; 0 to 20% by weight, preferably 0 to 12% by weight, of $Li_2O$; 0 to 10% by weight, preferably 0 to 3% by weight, of ZnO; 0 to 10% by weight, preferably 0 to 3% by weight, of BaO; and 0 to 5% by weight, preferably 0 to 3% by weight, of metallic oxides (e.g., CoO, $Cr_2O_3$ or other pigments).

Frit useful for forming vitreous binder may also contain frit binders (e.g., feldspar, borax, quartz, soda ash, zinc oxide, whiting, antimony trioxide, titanium dioxide, sodium silicofluoride, flint, cryolite, boric acid, and combinations thereof) and other minerals (e.g., clay, kaolin, wollastonite, limestone, dolomite, chalk, and combinations thereof).

Vitreous binder in the magnetizable abrasive particles may be selected, for example, based on a desired coefficient of thermal expansion (CTE). Generally, it is useful for the vitreous binder and abrasive particles to have similar CTEs, for example, ±100%, 50%, 40%, 25%, or 20% of each other. The CTE of fused alumina is typically about $8 \times 10^{-6}$/Kelvin (K). A vitreous binder may be selected to have a CTE in a range from $4 \times 10^{-6}$/K to $16 \times 10^{-6}$/K. An example of a glass frit for making a suitable vitreous binder is commercially available, for example, as F245 from Fusion Ceramics, Carrollton, Ohio.

During manufacture, the vitreous binder precursor, in a powder form, may be mixed with a temporary binder, typically an organic binder (e.g., starch, sucrose, mannitol), which burns out during firing of the vitreous binder precursor.

Organic binders (e.g., crosslinked organic polymers) are generally prepared by curing (i.e., crosslinking) a resinous organic binder precursor. Examples of suitable organic binder precursors include thermally-curable resins and radiation-curable resins, which may be cured, for example, thermally and/or by exposure to radiation. Exemplary organic binder precursors include glues, phenolic resins, aminoplast resins, urea-formaldehyde resins, melamine-formaldehyde resins, urethane resins, acrylic resins (e.g., aminoplast resins having pendant α,β-unsaturated groups, acrylated urethanes, acrylated epoxy resins, acrylated isocyanurates), acrylic monomer/oligomer resins, epoxy resins (including bismaleimide and fluorene-modified epoxy resins), isocyanurate resins, an combinations thereof. Curatives such as thermal initiators, catalysts, photoinitiators, hardeners, and the like may be added to the organic binder precursor, typically selected and in an effective amount according to the resin system chosen.

Firing/sintering of vitreous binders can be done, for example, in a kiln or tube furnace using techniques known in the art. Conditions for curing organic binder precursors may include heating in an oven or with infrared radiation and/or actinic radiation (e.g., in the case of photoinitiated cure) using techniques known in the art.

Useful abrasive materials that can be used as ceramic bodies include, for example, fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minn., black silicon carbide, green silicon carbide, titanium diboride, boron carbide, tungsten carbide, titanium carbide, cubic boron nitride, garnet, fused alumina zirconia, sol-gel derived ceramics (e.g., alumina ceramics doped with chromia, ceria, zirconia, titania, silica, and/or tin oxide), silica (e.g., quartz, glass beads, glass bubbles and glass fibers), feldspar, or flint. Examples of sol-gel derived crushed ceramic particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.).

Further details concerning methods of making sol-gel-derived ceramic particles suitable or use as ceramic bodies can be found in, for example, U.S. Pat. No. 4,314,827 (Leitheiser), U.S. Pat. No. 5,152,917 (Pieper et al.), U.S. Pat. No. 5,213,591 (Celikkaya et al.), U.S. Pat. No. 5,435,816 (Spurgeon et al.), U.S. Pat. No. 5,672,097 (Hoopman et al.), U.S. Pat. No. 5,946,991 (Hoopman et al.), U.S. Pat. No. 5,975,987 (Hoopman et al.), and U.S. Pat. No. 6,129,540 (Hoopman et al.), and in U.S. Publ. Pat. Appln. Nos. 2009/0165394 A1 (Culler et al.) and 2009/0169816 A1 (Erickson et al.).

The ceramic body may be shaped (e.g., precisely-shaped) or random (e.g., crushed). Shaped abrasive particles and precisely-shaped ceramic bodies may be prepared by a molding process using sol-gel technology as described in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina particles that have been formed in a specific shape, then crushed to form shards that retain a portion of their original shape features. In some embodiments, the ceramic bodies are precisely-shaped (i.e., the ceramic bodies have shapes that are at least partially determined by the shapes of cavities in a production tool used to make them).

Exemplary shapes of ceramic bodies include crushed, pyramids (e.g., 3-, 4-, 5-, or 6-sided pyramids), truncated pyramids (e.g., 3-, 4-, 5-, or 6-sided truncated pyramids), cones, truncated cones, rods (e.g., cylindrical, vermiform), and prisms (e.g., 3-, 4-, 5-, or 6-sided prisms).

Details concerning such ceramic bodies and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris).

Magnetizable abrasive particles and/or ceramic bodies according to the present disclosure may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F18, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the magnetizable abrasive particles and/or can be graded to a nominal screened grade using U.S.A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the magnetizable abrasive particles pass through a test sieve meeting ASTM E-11 specifications for the number 18 sieve and are retained on a test sieve meeting ASTM E-11 specifications for the number 20 sieve. In one embodiment, the crushed abrasive particles have a particle size such that most of the particles pass through an 18 mesh test sieve and can be retained on a 20, 25, 30, 35, 40, 45, or 50 mesh test sieve. In various embodiments, the crushed abrasive particles can have a nominal screened grade of: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size can be used such as −90+100.

Examples of useful backings include films, foams (open cell or closed cell), papers, foils, and fabrics. The backing may be, for example, a thermoplastic film that includes a thermoplastic polymer, which may contain various additive(s). Examples of suitable additives include colorants, processing aids, reinforcing fibers, heat stabilizers, UV stabilizers, and antioxidants. Examples of useful fillers include clays, calcium carbonate, glass beads, talc, clays, mica, wood flour; and carbon black. The backing may be a composite film, for example a coextruded film having two or more discrete layers.

Suitable thermoplastic polymers include, for example, polyolefins (e.g., polyethylene, and polypropylene), polyesters (e.g., polyethylene terephthalate), polyamides (e.g., nylon-6 and nylon-6,6), polyimides, polycarbonates, and combinations and blends thereof.

Typically, the average thickness of the backing is in a range of from at least 1 mil (25 microns) to 100 mils (2.5 mm), although thicknesses outside of this range may also be used.

The abrasive layer comprises shaped abrasive composites, each comprising magnetizable abrasive particles dispersed in an organic binder. The structured abrasive layer may be continuous or discontinuous, for example, it may have regions devoid of shaped abrasive composites.

Typically, the shaped abrasive composites are arranged on the backing according to a predetermined pattern or array, although this is not a requirement. The shaped abrasive composites may have substantially identical shapes and/or sizes or a mixture of various shapes and/or sizes. Typically, essentially all of the shaped abrasive composites in the abrasive layer have the same size and shape, allowing for manufacturing tolerances (e.g., with respect to missing portions of some shaped abrasive composites or excess material that may be present), although different shapes and sizes are also permissible.

In preferred embodiments, the shaped abrasive composites are "precisely-shaped abrasive composites", although this is not a requirement. This means that the precisely-shaped abrasive composites are defined by relatively smooth surfaced sides that are bounded and joined by well-defined edges having distinct edge lengths with distinct endpoints defined by the intersections of the various sides. The terms "bounded" and "boundary" refer to the exposed surfaces and edges of each composite that delimit and define the actual three-dimensional shape of each precisely-shaped abrasive composite. These boundaries are readily visible and discernible when a cross-section of an abrasive article is viewed under a scanning electron microscope. These boundaries separate and distinguish one precisely-shaped abrasive composite from another even if the composites abut each other along a common border at their bottom surfaces. By comparison, in a shaped abrasive composite that does not have a precise shape, the boundaries and edges are not well-defined (e.g., where the abrasive composite sags before completion of its curing).

The abrasive layer comprises shaped abrasive composites, preferably including at least some precisely-shaped abrasive composites, although this is not a requirement. Individual shaped abrasive composites may have the same size and/or shape, although they may be different. In some embodiments, they may have different sizes and/or shapes.

In some embodiments, the shaped abrasive composites in the abrasive layer consist essentially (i.e., other than shapes due to manufacturing defects) of the shaped abrasive composites. As used herein, the term "manufacturing defect" refers to an unintentional depression, air-void, or bubble in the shape of surface of the shaped abrasive composite that typically varies in location and/or size from one shaped abrasive composite to the next. By looking at the overall shape and pattern of many shaped abrasive composites in the abrasive article, the shaped abrasive composite defects are readily discernible when comparing the individual shaped abrasive composites in the abrasive layer.

Shaped (including precisely-shaped) abrasive composites may be of any three-dimensional shape that results in at least one of a raised feature or recess on the exposed surface of the abrasive layer. Useful shapes include, for example, cubic, prismatic, pyramidal (e.g., trigonal pyramidal, square pyramidal, or hexagonal pyramidal), truncated pyramidal (e.g., trigonal, square, or hexagonal truncated pyramidal), conical, and frustoconical. Combinations of differently shaped and/or sized abrasive composites may also be used. The abrasive layer of the structured abrasive may be continuous or discontinuous.

The shaped abrasive composites may comprise a close packed array; however, it may be useful to separate the shaped abrasive composites to control the load-bearing area of the structured abrasive article. As used herein, the term "load-bearing area", expressed as a percentage, refers to the combined area of all bottom surfaces of all shaped abrasive composites divided by the total area of the first surface of the backing. Typically, the load-bearing area is in a range of from 10 to 100 percent, more typically in a range of from 15 to 60 percent, and still more typically in a range of from 20 to 50 percent, although this is not a requirement. Load-bearing areas less than 100 percent may be achieved, for example, by including channels between individual shaped abrasive composites, or between close packed arrays of the shaped abrasive composites.

For fine finishing applications, the height of the shaped abrasive composites is generally greater than or equal to one micron and less than or equal to 20 mils (510 microns); for example, less than 15 mils (380 microns), 10 mils (250 microns), 5 mils (130 microns), 2 mils (50 microns), or even less than one mil (25 microns), although greater and lesser heights may also be used.

For fine finishing applications, the areal density of the shaped abrasive composites in the abrasive layer is typically in a range of from at least 1000, 10000, or even at least 20000 shaped abrasive composites per square inch (e.g., at least 150, 1500, or even 310 shaped abrasive composites per square centimeter) up to and including 50000, 70000, or even as many as 100000 shaped abrasive composites per square inch (7800, 11000, or even as many as 15000 shaped abrasive composites per square centimeter), although greater or lesser densities of shaped abrasive composites may also be used.

In embodiments adapted for fine finishing, the magnetizable abrasive particles preferably have an average particle size of less than or equal to 120 microns, although average particle sizes outside of this range may also be used. For repair and finishing applications, useful abrasive particle sizes for magnetizable abrasive particles, and optional diluent non-magnetizable abrasive particles if present, typically range from an average particle size in a range of from at least 0.01, 1, 3 or even 5 microns up to and including 35, 100, 250, 500, or even as much as 1500 microns.

The magnetizable abrasive particles are dispersed in an organic binder, which may be thermoplastic and/or cross-linked. This is generally accomplished by dispersing the abrasive particles in a binder precursor usually in the presence of an appropriate curative (e.g., photoinitiator, thermal curative, and/or catalyst).

The magnetizable abrasive particles may be combined with optional non-magnetizable abrasive particles (e.g., equivalent to ceramic bodies discussed hereinabove, crushed abrasive grain, and/or diamond), and/or filler particles.

Suitable organic binders for the shaped abrasive composites may be the same as, or different from, organic binders that can be used in the magnetizable layer described hereinabove. Examples of suitable organic binders that are useful in abrasive composites include phenolics, aminoplasts, urethanes, epoxies, acrylics, cyanates, isocyanurates, glue, and combinations thereof.

Shaped abrasive composites may be produced "in-situ" during the production of an abrasive article or, alternatively, shaped abrasive composite particles may be produced in a first operation and adhered to a backing in a second operation. Shaped abrasive composites typically comprise about 20 to 40 percent by weight binder, about 20 percent to 60 percent by weight abrasive particles, about 10 to 40 percent water-insoluble metal silicate particles, and about 0.01 to 2.5 percent by weight coupling agent, however other amounts may also be used. More preferably, abrasive composites consists essentially of about 30 to 35 percent by weight binder, about 35 to 50 percent by weight abrasive particles, about 15 to 30 percent by weight water-insoluble metal silicate particles, and about 1 to 2 percent by weight of coupling agent.

Typically, the organic binder is prepared by crosslinking (e.g., at least partially curing and/or polymerizing) an organic binder precursor. Suitable organic binder precursors for the shaped abrasive composites may be the same as, or different from, organic binder precursors that can be used in the magnetizable layer described hereinabove. During the manufacture of the structured abrasive article, the organic binder precursor may be exposed to an energy source which aids in the initiation of polymerization (typically including crosslinking) of the organic binder precursor. Examples of energy sources include thermal energy and radiation energy which includes electron beam, ultraviolet light, and visible light. In the case of an electron beam energy source, curative is not necessarily required because the electron beam itself generates free radicals.

After this polymerization process, the organic binder precursor is converted into a solidified organic binder. Alternatively, for a thermoplastic organic binder precursor, during the manufacture of the abrasive article the thermoplastic organic binder precursor is cooled to a degree that results in solidification of the organic binder precursor. Upon solidification of the binder precursor, the abrasive composite is formed.

There are two main classes of polymerizable resins that may preferably be included in the organic binder precursor, condensation polymerizable resins and addition polymerizable resins. Addition polymerizable resins are advantageous because they are readily cured by exposure to radiation energy. Addition polymerized resins can polymerize, for example, through a cationic mechanism or a free-radical mechanism. Depending upon the energy source that is utilized and the binder precursor chemistry, a curing agent, initiator, or catalyst may be useful to help initiate the polymerization.

Examples of typical binder precursors include phenolic resins, urea-formaldehyde resins, aminoplast resins, urethane resins, melamine formaldehyde resins, cyanate resins, isocyanurate resins, (meth)acrylate resins (e.g., (meth)acrylated urethanes, (meth)acrylated epoxies, ethylenically-unsaturated free-radically polymerizable compounds, aminoplast derivatives having pendant alpha, beta-unsaturated carbonyl groups, isocyanurate derivatives having at least one pendant acrylate group, and isocyanate derivatives having at least one pendant acrylate group) vinyl ethers, epoxy resins, and mixtures and combinations thereof. As used herein, the term "(meth)acryl" encompasses acryl and methacryl.

Phenolic resins have good thermal properties, availability, and relatively low cost and ease of handling. There are two types of phenolic resins, resole and novolac. Resole phenolic resins have a molar ratio of formaldehyde to phenol of greater than or equal to one to one, typically in a range of from 1.5:1.0 to 3.0:1.0. Novolac resins have a molar ratio of formaldehyde to phenol of less than one to one. Examples of commercially available phenolic resins include those known by the trade designations DUREZ and VARCUM from Occidental Chemicals Corp., Dallas, Tex.; RESINOX from Monsanto Co., Saint Louis, Mo.; and AEROFENE and AROTAP from Ashland Specialty Chemical Co., Dublin, Ohio.

(Meth)acrylated urethanes include di(meth)acrylate esters of hydroxyl-terminated NCO extended polyesters or polyethers. Examples of commercially available acrylated urethanes include those available as CMD 6600, CMD 8400, and CMD 8805 from Cytec Industries, West Paterson, N.J.

(Meth)acrylated epoxies include di(meth)acrylate esters of epoxy resins such as the diacrylate esters of bisphenol A epoxy resin. Examples of commercially available acrylated epoxies include those available as CMD 3500, CMD 3600, and CMD 3700 from Cytec Industries.

Ethylenically-unsaturated free-radically polymerizable compounds include both monomeric and polymeric compounds that contain atoms of carbon, hydrogen, and oxygen, and optionally, nitrogen and the halogens. Oxygen or nitrogen atoms or both are generally present in ether, ester, urethane, amide, and urea groups. Ethylenically-unsaturated free-radically polymerizable compounds typically have a molecular weight of less than about 4,000 g/mole and are typically esters made from the reaction of compounds containing a single aliphatic hydroxyl group or multiple aliphatic hydroxyl groups and unsaturated carboxylic acids, such as acrylic acid, methacrylic acid, itaconic acid, crotonic acid, isocrotonic acid, maleic acid, and the like. Representative examples of ethylenically-unsaturated free-radically polymerizable compounds include methyl methacrylate, ethyl methacrylate, styrene, divinylbenzene, vinyl toluene, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, and pentaerythritol tetraacrylate. Other ethylenically unsaturated resins include monoallyl, polyallyl, and polymethallyl esters and amides of carboxylic acids, such as diallyl phthalate, diallyl adipate, and N,N-diallyladipamide. Still other nitrogen containing compounds include tris(2-acryloyl-oxyethyl) isocyanurate, 1,3,5-tris(2-methyacryloxyethyl)-s-triazine, acrylamide, N-methylacrylamide, N,N-dimethylacrylamide, N-vinylpyrrolidone, and N-vinylpiperidone.

Useful aminoplast resins have at least one pendant alpha, beta-unsaturated carbonyl group per molecule or oligomer. These unsaturated carbonyl groups can be acrylate, methacrylate, or acrylamide type groups. Examples of such materials include N-(hydroxymethyl)acrylamide, N,N'-oxydimethylenebisacrylamide, ortho- and para-acrylamidomethylated phenol, acrylamidomethylated phenolic novolac, and combinations thereof. These materials are further described in U.S. Pat. Nos. 4,903,440 and 5,236,472 (both to Kirk et al.).

Isocyanurate derivatives having at least one pendant acrylate group and isocyanate derivatives having at least one pendant acrylate group are further described in U.S. Pat. No.

4,652,274 (Boettcher et al.). An example of one isocyanurate material is the triacrylate of tris(hydroxyethyl) isocyanurate.

Epoxy resins have one or more epoxy groups that may be polymerized by ring opening of the epoxy group(s). Such epoxy resins include monomeric epoxy resins and oligomeric epoxy resins. Examples of useful epoxy resins include 2,2-bis[4-(2,3-epoxypropoxy)-phenyl propane] (diglycidyl ether of bisphenol) and materials available as EPON 828, EPON 1004, and EPON 1001F from Momentive Specialty Chemicals, Columbus, Ohio; and DER-331, DER-332, and DER-334 from Dow Chemical Co., Midland, Mich. Other suitable epoxy resins include glycidyl ethers of phenol formaldehyde novolac commercially available as DEN-431 and DEN-428 from Dow Chemical Co.

Epoxy resins can polymerize via a cationic mechanism with the addition of an appropriate cationic curing agent. Cationic curing agents generate an acid source to initiate the polymerization of an epoxy resin. These cationic curing agents can include a salt having an onium cation and a halogen containing a complex anion of a metal or metalloid. Other curing agents (e.g., amine hardeners and guanidines) for epoxy resins and phenolic resins may also be used.

Other cationic curing agents include a salt having an organometallic complex cation and a halogen containing complex anion of a metal or metalloid which are further described in U.S. Pat. No. 4,751,138 (Tumey et al.). Another example is an organometallic salt and an onium salt is described in U.S. Pat. No. 4,985,340 (Palazzotto et al.); U.S. Pat. No. 5,086,086 (Brown-Wensley et al.); and U.S. Pat. No. 5,376,428 (Palazzotto et al.). Still other cationic curing agents include an ionic salt of an organometallic complex in which the metal is selected from the elements of Periodic Group IVB, VB, VIB, VIIB and VIIIB which is described in U.S. Pat. No. 5,385,954 (Palazzotto et al.).

Examples of free radical thermal initiators include peroxides, e.g., benzoyl peroxide and azo compounds.

Compounds that generate a free radical source if exposed to actinic electromagnetic radiation are generally termed photoinitiators. Examples of photoinitiators include benzoin and its derivatives such as α-methylbenzoin; α-phenylbenzoin; α-allylbenzoin; α-benzylbenzoin; benzoin ethers such as benzil dimethyl ketal (e.g., as commercially available as IRGACURE 651 from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (e.g., as DAROCUR 1173 from Ciba Specialty Chemicals) and 1-hydroxycyclohexyl phenyl ketone (e.g., as IRGACURE 184 from Ciba Specialty Chemicals); 2-methyl-1-[4-(methylthio)phenyl]-2-(4-morpholinyl)-1-propanone (e.g., as IRGACURE 907 from Ciba Specialty Chemicals; 2-benzyl-2-(dimethylamino)-1-[4-(4-morpholinyl)phenyl]-1-butanone (e.g., as IRGACURE 369 from Ciba Specialty Chemicals). Other useful photoinitiators include, for example, pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, or benzanthraquinone), halomethyltriazines, benzophenone and its derivatives, iodonium salts and sulfonium salts, titanium complexes such as bis ($\eta_5$-2,4-cyclopentadien-1-yl)-bis[2,6-difluoro-3-(1H-pyrrol-1-yl)phenyl]titanium (e.g., as CGI 784DC from Ciba Specialty Chemicals); halonitrobenzenes (e.g., 4-bromomethylnitrobenzene), mono- and bis-acylphosphines (e.g., as IRGACURE 1700, IRGACURE 1800, IRGACURE 1850, and DAROCUR 4265 all from Ciba Specialty Chemicals). Combinations of photoinitiators may be used. One or more spectral sensitizers (e.g., dyes) may be used in conjunction with the photoinitiator(s), for example, in order to increase sensitivity of the photoinitiator to a specific source of actinic radiation.

To promote an association bridge between the abovementioned binder and the abrasive particles, a silane coupling agent may be included in the slurry of abrasive particles and organic binder precursor; typically in an amount of from about 0.01 to 5 percent by weight, more typically in an amount of from about 0.01 to 3 percent by weight, more typically in an amount of from about 0.01 to 1 percent by weight, although other amounts may also be used, for example depending on the size of the abrasive particles. Suitable silane coupling agents include, for example, methacryloxypropylsilane, vinyltriethoxysilane, vinyltris(2-methoxyethoxy)silane, 3,4-epoxycyclohexylmethyltrimethoxysilane, γ-glycidoxypropyltrimethoxysilane, and γ-mercaptopropyltrimethoxysilane (e.g., as available under the respective trade designations A-174, A-151, A-172, A-186, A-187, and A-189 from Witco Corp. of Greenwich, Conn.), allyltriethoxysilane, diallyldichlorosilane, divinyldiethoxysilane, and meta, para-styrylethyltrimethoxysilane (e.g., as commercially available under the respective trade designations A0564, D4050, D6205, and S 1588 from United Chemical Industries, Bristol, Pa.), dimethyldiethoxysilane, dihydroxydiphenylsilane, triethoxysilane, trimethoxysilane, triethoxysilanol, 3-(2-aminoethylamino) propyltrimethoxysilane, methyltrimethoxysilane, vinyltriacetoxysilane, methyltriethoxysilane, tetraethyl orthosilicate, tetramethyl orthosilicate, ethyltriethoxysilane, amyltriethoxysilane, ethyltrichlorosilane, amyltrichlorosilane, phenyltrichlorosilane, phenyltriethoxysilane, methyltrichlorosilane, methyldichlorosilane, dimethyldichlorosilane, dimethyldiethoxysilane, and mixtures thereof.

The organic binder precursor may optionally contain additives such as, for example, colorants, grinding aids, fillers, wetting agents, dispersing agents, light stabilizers, and antioxidants.

Grinding aids, which may optionally be included in the abrasive layer via the binder precursor, encompass a wide variety of different materials including both organic and inorganic compounds. A sampling of chemical compounds effective as grinding aids includes waxes, organic halide compounds, halide salts, metals and metal alloys. Specific waxes effective as a grinding aid include specifically, but not exclusively, the halogenated waxes tetrachloronaphthalene and pentachloronaphthalene. Other effective grinding aids include halogenated thermoplastics, sulfonated thermoplastics, waxes, halogenated waxes, sulfonated waxes, and mixtures thereof. Other organic materials effective as a grinding aid include specifically, but not exclusively, polyvinylchloride and polyvinylidene chloride. Examples of halide salts generally effective as a grinding aid include sodium chloride, potassium cryolite, sodium cryolite, ammonium cryolite, potassium tetrafluoroborate, sodium tetrafluoroborate, silicon fluorides, potassium chloride, and magnesium chloride. Halide salts employed as a grinding aid typically have an average particle size of less than 100 microns, with particles of less than 25 microns being preferred. Examples of metals generally effective as a grinding aid include antimony, bismuth, cadmium, cobalt, iron, lead, tin, and titanium. Other commonly used grinding aids include sulfur, organic sulfur compounds, graphite, and metallic sulfides. Combinations of these grinding aids can also be employed.

The optional supersize, if present, is disposed on at least a portion of the abrasive layer. For example, a supersize may be disposed only on the shaped abrasive composites (e.g., on their top surfaces), although it may also be disposed on the channels. Examples of supersizes include one or more compounds selected from the group consisting of secondary grinding aids such as alkali metal tetrafluoroborate salts, metal salts of fatty acids (e.g., zinc stearate or calcium stearate), and salts of phosphate esters (e.g., potassium behenyl phosphate), phosphate esters, urea-formaldehyde resins, mineral oils, crosslinked silanes, crosslinked silicones, and/or fluorochemicals; fibrous materials; antistatic agents; lubricants; surfactants; pigments; dyes; coupling agents; plasticizers: antiloading agents; release agents; suspending agents; rheology modifiers; curing agents; and mixtures thereof. A secondary grinding aid is preferably selected from the group of sodium chloride, potassium aluminum hexafluoride, sodium aluminum hexafluoride, ammonium aluminum hexafluoride, potassium tetrafluoroborate, sodium tetrafluoroborate, silicon fluorides, potassium chloride, magnesium chloride, and mixtures thereof. In some embodiments, one or more metal salts of fatty acids (e.g., zinc stearate) may be usefully included in the supersize.

The structured abrasive article may optionally include an attachment interface layer such as, for example, a hooked film, looped fabric, or pressure-sensitive adhesive, secured to the backing, that affixes the structured abrasive article to a tool or backup pad during use.

Useful pressure-sensitive adhesives (PSAs) include, for example, hot melt PSAs, solvent-based PSAs, and latex-based PSAs. Pressure-sensitive adhesives are widely commercially available; for example, from 3M Company. The PSA layer, if present may be coated onto the backing any suitable technique including, for example, spraying, knife coating, and extrusion coating. In some embodiments, a release liner may be disposed on the pressure-sensitive layer to protect it prior to use. Examples of release liners include polyolefin films and siliconized papers.

Structured abrasive articles according to the present disclosure may be prepared by forming a slurry of abrasive particles comprising magnetizable abrasive particles, and optionally nonmagnetizable abrasive particles, and a solidifiable or polymerizable precursor of the abovementioned binder resin (i.e., a binder precursor), contacting the slurry with a backing (or if present, optional adhesive layer), at least partially orienting the magnetizable abrasive particles using an external magnetic field, and at least partially curing the binder precursor (e.g., by exposure to an energy source) in a manner such that the resulting structured abrasive article has a plurality of shaped abrasive composites affixed to the backing. Examples of energy sources include thermal energy and radiant energy (including electron beam, ultraviolet light, and visible light).

The magnetic field may be supplied by one or more permanent magnets (e.g., a rare-earth magnet) and/or electromagnets. Typically, the viscosity of the organic binder precursor and the dwell time in the magnetic field prior to curing is sufficient to allow the magnetizable abrasive particles to at least partially align with the lines of magnetic force. In preferred embodiments, the orientation occurs between two magnets wherein the lines of magnetic force between the magnetic force are uniform. In preferred embodiments, at least some curing of the organic binder precursor occurs while the shaped abrasive composite precursors are still in this region of magnetic field in order to fixed the orientation; however, curing may be partially or completely performed outside of the aligning magnetic field. Typically, the magnetizable particles will tend to align with their magnetizable layers substantially longitudinally aligned with lines of the applied magnetic force.

In one embodiment, a slurry of abrasive particles, which comprises magnetizable abrasive particles and optionally nonmagnetizable abrasive particles, in an organic binder precursor may be coated directly onto a production tool having shaped cavities (preferably cavities formed of planar surfaces that intersect at sharp angles) therein and brought into contact with the backing (or if present, optional adhesive layer), or coated on the backing and brought to contact with the production tool. The magnetizable abrasive particles are then oriented by an applied magnetic field (in other embodiments, orientation can be before contacting the backing with the slurry/mold surface), and at least partially cured to form shaped abrasive composites disposed on the major surface of the backing and still within the cavities of the mold surface of the production tool. In this embodiment, the slurry is typically then solidified (e.g., at least partially cured) while it is present in the cavities of the production tool. Finally, the shaped abrasive composites are separated from the production tool thereby providing a structured abrasive article according to the present disclosure.

The production tool can be a belt, a sheet, a continuous sheet or web, a coating roll such as a rotogravure roll, a sleeve mounted on a coating roll, or die. The production tool can be composed of metal (e.g., nickel), metal alloys, or plastic. The metal production tool can be fabricated by any conventional technique such as, for example, engraving, bobbing, electroforming, or diamond turning. A thermoplastic tool can be replicated off a metal master tool. The master tool will have the inverse pattern desired for the production tool. The master tool can be made in the same manner as the production tool. The master tool is preferably made out of metal, e.g., nickel and is diamond turned. The thermoplastic sheet material can be heated along with the master tool such that the thermoplastic material is embossed with the master tool pattern by pressing the two together. The thermoplastic can also be extruded or cast onto the master tool and then pressed. The thermoplastic material is cooled to solidify and produce the production tool. Examples of thermoplastic production tool materials include polyester, polycarbonates, polyvinyl chloride, polypropylene, polyethylene and combinations thereof. If a thermoplastic production tool is utilized, then care should typically be taken not to generate excessive heat that may distort the thermoplastic production tool.

The production tool may also contain a release coating to permit easier release of the abrasive article from the production tool. Examples of such release coatings for metals include hard carbide, nitrides or borides coatings. Examples of release coatings for thermoplastics include silicones, and fluorochemicals.

Additional details concerning methods of manufacturing structured abrasive articles having precisely-shaped abrasive composites may be found, for example, in U.S. Pat. No. 5,152,917 (Pieper et al.); U.S. Pat. No. 5,435,816 (Spurgeon et al.); U.S. Pat. No. 5,672,097 (Hoopman); U.S. Pat. No. 5,681,217 (Hoopman et al.); U.S. Pat. No. 5,454,844 (Hibbard et al.); U.S. Pat. No. 5,851,247 (Stoetzel et al.); and U.S. Pat. No. 6,139,594 (Kincaid et al.).

In another embodiment, a slurry comprising a binder precursor and abrasive particles may be deposited on a backing in a patterned manner (e.g., by screen or gravure printing) and partially polymerized to render at least the surface of the coated slurry plastic but non-flowing. Then, a pattern is embossed upon the partially polymerized slurry formulation, which is subsequently further cured (e.g., by exposure to an energy source) to form a plurality of shaped abrasive composites affixed to the backing. Further details concerning this method and related methods are described, for example, in U.S. Pat. No. 5,833,724 (Wei et al.); U.S. Pat. No. 5,863,306 (Wei et al.); U.S. Pat. No. 5,908,476 (Nishio et al.); U.S. Pat. No. 6,048,375 (Yang et al.); U.S. Pat. No. 6,293,980 (Wei et al.); U.S. Pat. No. 7,491,251 (Welygan et al.); and U.S. Pat. Appl. Publ. No. 2001/0041511 (Lack et al.).

Structured abrasive articles according to the present disclosure may be secured to a support structure such, for example, a backup pad secured to a tool such as, for example, a random orbital sander. The optional attachment interface layer may be, for example an adhesive (e.g., a pressure-sensitive adhesive) layer, a double-sided adhesive tape, a loop fabric for a hook and loop attachment (e.g., for use with a backup or support pad having a hooked structure affixed thereto), a hooked structure for a hook and loop attachment (e.g., for use with a backup or support pad having a looped fabric affixed thereto), or an intermeshing attachment interface layer (e.g., mushroom type interlocking fasteners designed to mesh with a like mushroom type interlocking fastener on a backup or support pad). Further details concerning such attachment interface layers may be found, for example, in U.S. Pat. No. 5,152,917 (Pieper et al.); U.S. Pat. No. 5,254,194 (Ott); U.S. Pat. No. 5,454,844 (Hibbard et al.); and U.S. Pat. No. 5,681,217 (Hoopman et al.); and U.S. Pat. Appl. Publ. Nos. 2003/0143938 (Braunschweig et al.) and 2003/0022604 (Annen et al.).

Likewise, the second major surface of the backing may have a plurality of integrally formed hooks protruding therefrom, for example, as described in U.S. Pat. No. 5,672,186 (Chesley et al.). These hooks will then provide the engagement between the structured abrasive article and a backup pad that has a loop fabric affixed thereto.

Structured abrasive articles according to the present disclosure may be provided in any form (for example, as a sheet, belt, or disc), and be of any overall dimensions. Embossed structured abrasive discs may have any diameter, but typically have a diameter in a range of from 0.5 centimeter to 15.2 centimeters. The structured abrasive article may have slots or slits therein and may be otherwise provided with perforations.

Structured abrasive articles according to the present disclosure are generally useful for abrading a workpiece, and especially those workpieces having a hardened polymeric layer thereon. The workpiece may comprise any material and may have any form. Examples of workpiece materials include metal, metal alloys, exotic metal alloys, ceramics, painted surfaces, plastics, polymeric coatings, stone, polycrystalline silicon, wood, marble, and combinations thereof. Examples of workpieces include molded and/or shaped articles (e.g., optical lenses, automotive body panels, boat hulls, counters, and sinks), wafers, sheets, and blocks.

A lubricating fluid may be used in conjunction with the structured abrasive article during abrading operations. Examples include oils, water, and surfactant solutions in water (e.g., anionic or nonionic surfactant solutions in water).

SELECT EMBODIMENTS OF THE PRESENT DISCLOSURE

In a first embodiment, the present disclosure provides a structured abrasive article comprising a plurality of shaped abrasive composites disposed on and secured to a major surface of a backing, wherein the shaped abrasive composites comprise magnetizable abrasive particles retained in an organic binder, wherein, on a respective basis, each of the magnetizable abrasive particles has a ceramic body with a magnetizable layer disposed on at least a portion thereof.

In a second embodiment, the present disclosure provides a structured abrasive article according to the first embodiment, wherein a majority of the magnetizable abrasive particles are aligned substantially perpendicular to the major surface of the backing.

In a third embodiment, the present disclosure provides a structured abrasive article according to the first or second embodiment, wherein each magnetizable layer substantially completely encloses the respective ceramic body.

In a fourth embodiment, the present disclosure provides a structured abrasive article according to any one of the first to third embodiments, wherein each magnetizable layer does not substantially completely enclose the respective ceramic body.

In a fifth embodiment, the present disclosure provides a structured abrasive article according to any one of the first to fourth embodiments, wherein the ceramic body comprises alpha alumina.

In a sixth embodiment, the present disclosure provides a structured abrasive article according to any one of the first to fifth embodiments, wherein the ceramic body is a precisely-shaped ceramic body.

In a seventh embodiment, the present disclosure provides a structured abrasive article according to any one of the first to sixth embodiments, wherein the shaped abrasive composites comprise precisely-shaped abrasive composites.

In an eighth embodiment, the present disclosure provides a structured abrasive article according to any one of the first to seventh embodiments, wherein the shaped abrasive composites are pyramidal.

In a ninth embodiment, the present disclosure provides a structured abrasive article according to any one of the first to eighth embodiments, wherein the shaped abrasive composites are close-packed.

In a tenth embodiment, the present disclosure provides a structured abrasive article according to any one of the first to ninth embodiments, wherein the magnetizable abrasive particles have an average aspect ratio of at least 3.

In an eleventh embodiment, the present disclosure provides a method of making a structured abrasive article, the method comprising the steps:

a) providing a production tool having a mold surface defining a plurality of precisely-shaped cavities;

b) filling at least a majority of the precisely-shaped cavities with a slurry comprising magnetizable abrasive particles dispersed in a curable organic binder precursor material, wherein, on a respective basis, the magnetizable abrasive particles each comprise a ceramic body having a magnetizable layer disposed on at least a portion thereof, wherein the magnetizable abrasive particles have an average aspect ratio of at least 3;

c) contacting a major surface of a backing with the mold surface of the production tool while the slurry is disposed within said at least a majority of the precisely-shaped cavities;

d) orienting the magnetizable abrasive particles by means of a magnetic field;

e) at least partially curing the curable organic binder precursor material to form shaped abrasive composites disposed on the major surface of the backing; and f) separating the shaped abrasive composites from the production tool.

In a twelfth embodiment, the present disclosure provides a method according to the eleventh embodiment, wherein steps d) and e) are carried out concurrently.

In a thirteenth embodiment, the present disclosure provides a method according to the eleventh embodiment, wherein steps d) and e) are carried out sequentially.

In a fourteenth embodiment, the present disclosure provides a method according to any one of the eleventh to thirteenth embodiments, wherein the magnetizable abrasive particles comprise a ceramic body having a having an outer surface with a magnetizable layer disposed on at least a portion thereof.

In a fifteenth embodiment, the present disclosure provides a method of making a structured abrasive article, the method comprising the steps:

a) contacting a major surface of a backing with a malleable composition comprising magnetizable abrasive particles dispersed in a curable organic binder precursor, wherein, on a respective basis, the magnetizable abrasive particles each comprise a ceramic body having a magnetizable layer disposed on at least a portion thereof, wherein the magnetizable abrasive particles have an average aspect ratio of at least 3;

b) orienting the magnetizable abrasive particles by means of a magnetic field;

c) at least partially curing the curable organic binder precursor to form shaped abrasive composites disposed on the major surface of the backing.

In a sixteenth embodiment, the present disclosure provides a method according to the fifteenth embodiment, wherein steps a) and b) are carried out concurrently.

In a seventeenth embodiment, the present disclosure provides a method according to the fifteenth embodiment, wherein steps b) and c) are carried out concurrently.

In an eighteenth embodiment, the present disclosure provides a method according to the fifteenth embodiment, wherein steps a) and b) are carried out sequentially.

In a nineteenth embodiment, the present disclosure provides a method according to the fifteenth embodiment, wherein steps b) and c) are carried out sequentially.

In a twentieth embodiment, the present disclosure provides a method according to any one of the fifteenth to nineteenth embodiments, wherein the ceramic body is a precisely-shaped ceramic body.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Unless stated otherwise, all other reagents were obtained, or are available from fine chemical vendors such as Sigma-Aldrich Company, St. Louis, Mo., or may be synthesized by known methods.

Materials used in the Examples are described in Table 1, below.

TABLE 1

| ABBREVIATION | DESCRIPTION |
| --- | --- |
| KBF4 | Potassium tetrafluoroborate, obtained from Atotech USA, Inc., Cleveland, Ohio |
| PI | 2-benxyl-2-N,N-dimethylamino-1-(4-morpholinophenyl)-1-butanone, commercially available under the trade designation IRGACURE 369 from BASF Corporation, Florham Park, New Jersey |
| SAP | Shaped abrasive particles were prepared according to the disclosure of U.S. Pat. No. 8,142,531 (Adefris et al). The shaped abrasive particles were prepared by molding alumina sol gel in equilateral triangle-shaped polypropylene mold cavities. After drying and firing, the resulting shaped abrasive particles were about 0.17 mm (side length) × 0.04 mm thick, with a draft angle approximately 98 degrees. |
| SCA | Silane coupling agent, γ-methacryloxypropyltrimethoxy-silane, obtained as A-174 from Momentive Performance Materials, Sisterville, West Virginia |
| SIL | Hydrophilic fumed silica, obtained as AEROSIL OX-50 from Evonik Industries, Essen, Germany |
| TATHEIC | Triacrylate of tris(hydroxyethyl) isocyanurate, obtained as SR368 from Sartomer, Exton, Pennsylvania |
| TMPTA | Trimethylolpropane triacrylate, commercially available under the trade designation SARTOMER 351 from Sartomer, Exton, Pennsylvania |

Preparation of Magnetizable Abrasive Particles

SAP was coated with 304 stainless steel using physical vapor deposition with magnetron sputtering, 304 stainless steel sputter target, described by Barbee et al. in Thin Solid Films, 1979, vol. 63, pp. 143-150, deposited as the magnetic ferritic body centered cubic form. The apparatus used for the preparation of 304 stainless steel film coated abrasive particles (i.e., magnetizable abrasive particles) was disclosed in U.S. Pat. No. 8,698,394 (McCutcheon et al.). 550 grams of SAP were placed in a particle agitator that was disclosed in U.S. Pat. No. 7,727,931 (Brey et al, Column 13, line 60). The blade end gap distance to the walls of the agitator was 1.7 mm. The physical vapor deposition was carried out for 4 hours at 1.0 kilowatt at an argon sputtering gas pressure of 10 millitorr (1.33 pascal) onto SAP. The density of the coated SAP was 3.937 grams per cubic centimeter (the density of the uncoated SAP was 3.914 grams per cubic centimeter). The weight percentage of metal coating in the coated abrasive particles was 0.58% and the coating thickness is 60 nanometers.

Example 1

An abrasive slurry was prepared as follows: 16.6 parts of TMPTA, 7.12 parts of TATHEIC, 0.84 parts of SCA, 0.24 parts of PI, 0.84 parts of SIL, 16.4 parts of KBF4, and 58 parts of coated SAP (i.e., magnetizable abrasive particles) were homogeneously dispersed for one hour using a mechanical mixer at 24° C. The resultant slurry was coated into a patterned polypropylene tool with pyramidal cavities prepared according to the disclosure of U.S. Pat. No. 5,435,816 (Spurgeon et al.), column 8, line 41 through column 10, line 20. The patterned polypropylene tooling's pattern was an array of four-sided pyramids 30 mils (1.02 mm) high× 90.5 mils (2.30 mm) square base having a land area of 16 mils (0.41 mm) between features and a feature density of 64 features/in$^2$ (9.92 features/cm$^2$).

Figure 4:
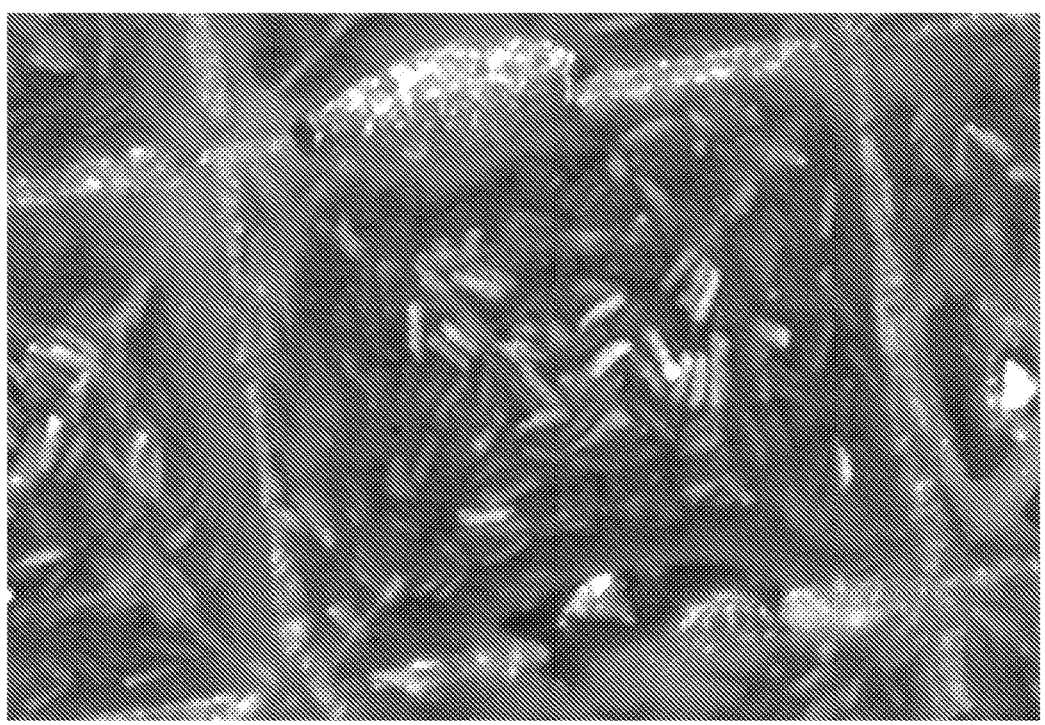
FIG. 4 is a digital micrograph of shaped abrasive composites produced according to Example 1.

The slurry was filled into the tooling while sitting on the face of a 6-inch (15.2-cm) diameter by 2-inch (5.1-cm) thick permanent neodymium magnet with an average magnetic field of 0.6 Tesla. An ethylene acrylic acid primed polyester film (0.1 mm thick, obtained as MA370M from 3M Company, Saint Paul, Minn.) was placed on top of the tooling cavities and smoothed with a plastic spatula to obtain intimate contact and wetting between the film and resin. The sample was subjected to UV light with a maximum intensity at 390 nanometers for 5 minutes to cure. Then the sample was removed from the surface of the magnet and the cured sample was removed from the tooling. Optical microscope pictures were taken from the top (i.e., opposite the backing) of the cured abrasive article (shown in FIG. 4). This sample had 95-100% of the magnetizable abrasive particles standing upright.

Example 2

Figure 5:
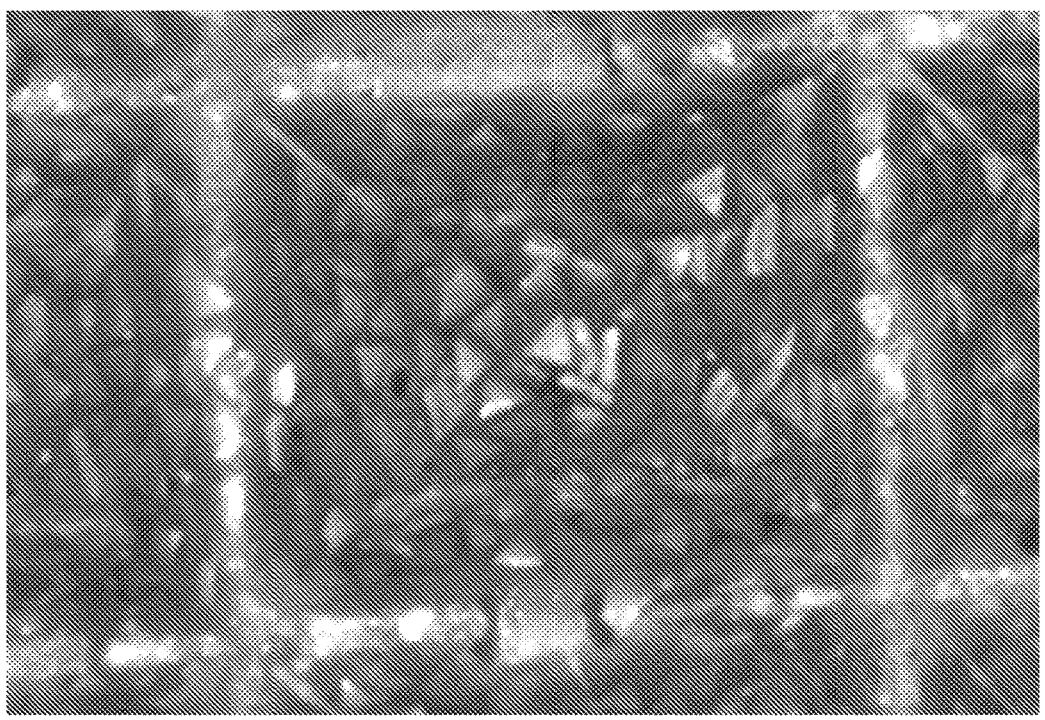
FIG. 5 is a digital micrograph of shaped abrasive composites produced according to Comparative Example A.

The procedure described above in Example 1 was repeated, except that the slurry was filled into the tooling without ever being subjected to the magnetic field. Optical microscope pictures were taken from the top (i.e., opposite the backing) of the cured abrasive article (shown in FIG. 5). This confirmed that this sample had a random distribution of particle orientation.

Comparative Example A

An abrasive slurry was prepared as follows: 16.6 parts of TMPTA, 7.12 parts of TATHEIC, 0.84 parts of SCA, 0.24 parts of PI, 0.84 parts of SIL, 16.4 parts of KBF4, and 58 parts of uncoated, bare SAP were homogeneously dispersed for one hour using a mechanical mixer at 24° C. The resultant slurry was coated into the polypropylene tool used in Example 1. An ethylene acrylic acid primed polyester film (0.1 mm thick, obtained as MA370M from 3M Company) was placed on top of the tooling cavities and smoothed with a plastic spatula to obtain intimate contact and wetting between the film and resin. The sample was subjected to UV light of 390 nanometer wavelength for 5 minutes to cure. Then the cured sample was removed from the tooling.
Performance Test Abrasive articles obtained from Examples 1 and 2 and Comparative Example A were converted into sheets of 6.0 cm×15.2 cm in length and were tested using the "Rocker Drum Test" as described in Examples of U.S. Pat. No. 5,700,302 (Stoetzel et al.). These samples were installed on a cylindrical steel drum of a testing machine which oscillates (rocks) back and forth in a small arc creating a 1.3 cm by 10.1 cm wear path. The rocker drum oscillated at a rate of approximately 60 cycles (i.e. one cycle is one back-and-forth motion) per minute along the wear path. The abrasive sample abraded a 1.3 cm×1.3 cm×15.2 cm Type 1018 carbon steel workpiece that was held stationary relative to the abrasive sample. A 3.6 kilogram load was applied to the workpiece using a lever arm with weights. The weight of the workpiece was measured every 100 cycles to determine the amount of material removed by the abrasive per 100 cycles. Total cut was measured as the cumulative mass loss in grams at the end of the test. Performance results are reported in Table 2, below.

TABLE 2

| NUMBER OF CYCLES | CUT PER NUMBER OF CYCLES, grams | | | | | TOTAL CUT, grams |
|---|---|---|---|---|---|---|
| | 100 | 200 | 300 | 400 | 500 | |
| Example 1 | 0.09 | 0.09 | 0.09 | 0.09 | 0.09 | 0.45 |
| Example 2 | 0.08 | 0.07 | 0.07 | 0.07 | 0.08 | 0.37 |
| Comparative Example A | 0.07 | 0.08 | 0.07 | 0.08 | 0.08 | 0.38 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A structured abrasive article comprising a plurality of shaped abrasive composites disposed on and secured to a major surface of a backing, wherein the shaped abrasive composites comprise magnetizable abrasive particles retained in and dispersed throughout an organic binder, wherein, on a respective basis, each of the magnetizable abrasive particles has a ceramic body with a magnetizable layer substantially completely enclosing the respective ceramic body, and wherein a majority of the magnetizable abrasive particles are aligned substantially perpendicular to the major surface of the backing.

2. The structured abrasive article of claim 1, wherein the ceramic body comprises alpha alumina.

3. The structured abrasive article of claim 1, wherein the ceramic body is a precisely-shaped ceramic body.

4. The structured abrasive article of claim 1, wherein the shaped abrasive composites comprise precisely-shaped abrasive composites.

5. The structured abrasive article of claim 1, wherein the shaped abrasive composites are pyramidal.

6. The structured abrasive article of claim 1, wherein the shaped abrasive composites are close-packed.

7. The structured abrasive article of claim 1, wherein the magnetizable abrasive particles have an average aspect ratio of at least 3.

8. A method of making a structured abrasive article, the method comprising the consecutive steps:
    a) providing a production tool having a mold surface defining a plurality of precisely-shaped cavities;
    b) filling at least a majority of the precisely-shaped cavities with a slurry comprising magnetizable abrasive particles dispersed throughout a curable organic binder precursor material, wherein, on a respective basis, the magnetizable abrasive particles each comprise a ceramic body having a magnetizable layer disposed on at least a portion thereof, wherein the magnetizable abrasive particles have an average aspect ratio of at least 3;
    c) contacting a major surface of a backing with the mold surface of the production tool while the slurry is disposed within said at least a majority of the precisely-shaped cavities;
    d) orienting the magnetizable abrasive particles by means of a magnetic field;
    e) at least partially curing the curable organic binder precursor material to form shaped abrasive composites disposed on the major surface of the backing; and
    f) separating the shaped abrasive composites from the production tool.

9. The method of claim 8, wherein steps d) and e) are carried out concurrently.

10. The method of claim 8, wherein steps d) and e) are carried out sequentially.

11. The method of claim 8, wherein the magnetizable abrasive particles comprise a ceramic body having a having an outer surface with a magnetizable layer disposed on at least a portion thereof.

12. A method of making a structured abrasive article, the method comprising the steps:
   a) contacting a major surface of a backing with a malleable composition comprising magnetizable abrasive particles dispersed throughout a curable organic binder precursor, wherein, on a respective basis, the magnetizable abrasive particles each comprise a ceramic body having a magnetizable layer disposed on at least a portion thereof, wherein the magnetizable abrasive particles have an average aspect ratio of at least 3;
   b) orienting the magnetizable abrasive particles by means of a magnetic field;
   c) at least partially curing the curable organic binder precursor to form shaped abrasive composites disposed on the major surface of the backing.

13. The method of claim 12, wherein steps a) and b) are carried out concurrently.

14. The method of claim 12, wherein steps b) and c) are carried out concurrently.

15. The method of claim 12, wherein steps a) and b) are carried out sequentially.

16. The method of claim 12, wherein steps b) and c) are carried out sequentially.

17. The method of claim 12, wherein the ceramic body is a precisely-shaped ceramic body.

\* \* \* \* \*